June 3, 1969  H. F. COX, JR  3,447,721
LIQUID MEASURING DEVICE
Filed March 13, 1967  Sheet 1 of 2

INVENTOR.
HERBERT F. COX, JR.
BY
ATTORNEY

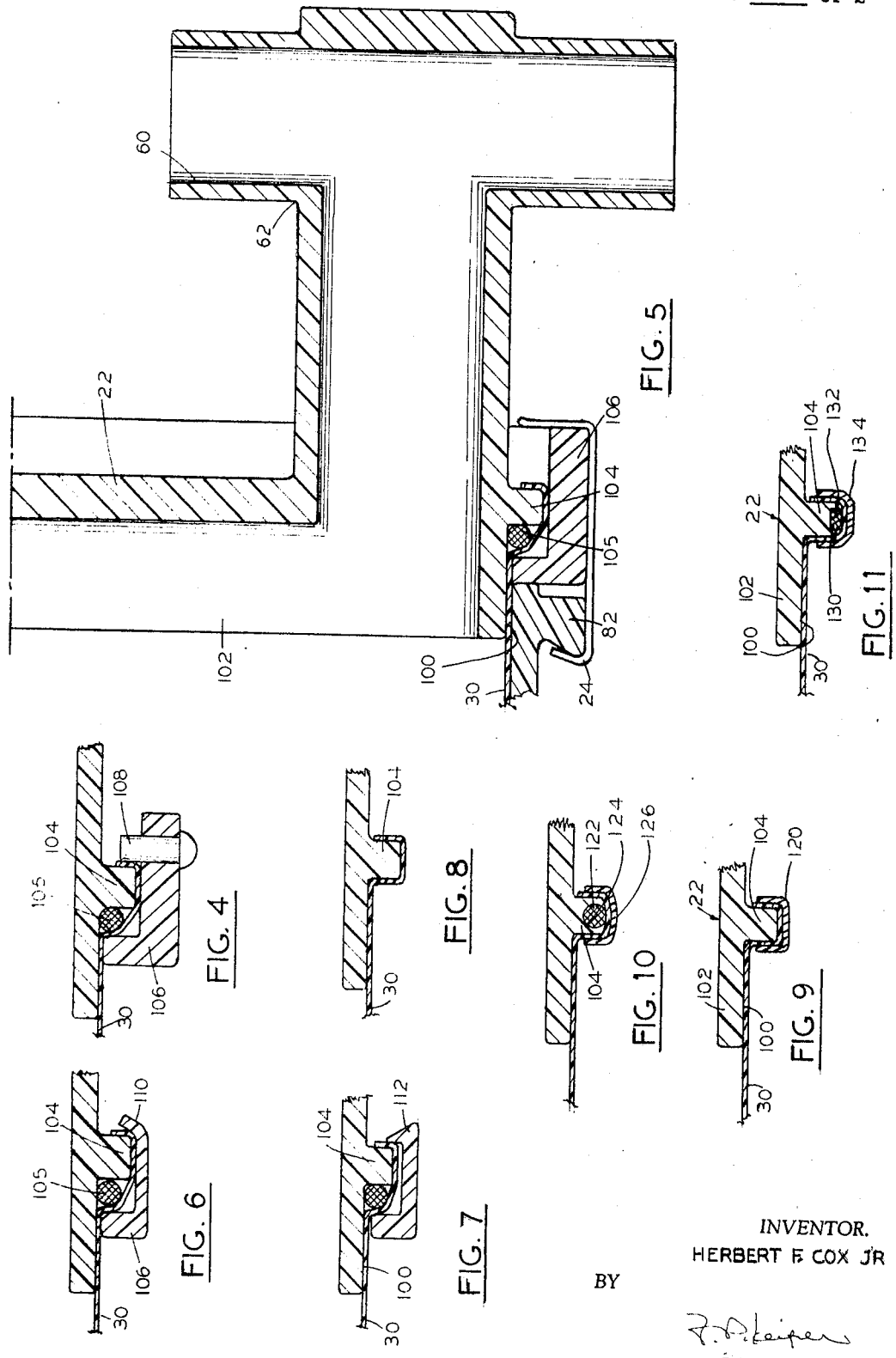

United States Patent Office 3,447,721
Patented June 3, 1969

3,447,721
LIQUID MEASURING DEVICE
Herbert F. Cox, Jr., 406 Sedgwick Drive,
Syracuse, N.Y. 13203
Filed Mar. 13, 1967, Ser. No. 622,512
Int. Cl. B65d 35/08, 37/00; G01f 11/02
U.S. Cl. 222—107   2 Claims

ABSTRACT OF THE DISCLOSURE

A measuring cylinder having a removable header carrying a flexible thin wall impervious liner disposed within the cylinder, and adapted to fill out into contact with the internal walls of the cylinder, which thus measures the volume that can be introduced into the liner. The cylinder has a movable disk, so as to vary the volume in which the liner can fill out in. The header and liner are inexpensive and discarded for a fresh sterile unit as often as necessary. A plurality of means for providing a sealed attachment of the liner to header are described.

This invention relates to the measuring of liquids in accurate portion dispensing, and relates to an improved measuring cylinder and replaceable liner and header adapted for employment in the apparatus shown in my copending Patent 3,380,628.

In Patent 3,380,628 there is shown a refrigerated dispensing unit adapted to recieve single service packages of beverage liquids to be dispensed. In addition there is shown a measuring unit for the dispensing of a pre-determined serving of the beverage, with provisions for preventing the operation of the apparatus when the supply from the single service package becomes sufficiently depleted as to be incapable of supplying the pre-determined quantity. The apparatus as therein described comprises a small measuring cylinder, a cap, and a flexible liner for the cylinder, adapted to fill out against the cylinder wall in the measurement of a portion to be dispensed. The cap is provided with means for admitting a portion to the liner, and for dispensing the portion, both means being under the control of pinch valves, acting on resilient tubing. The cap also includes a means for venting air from the liner, during the initial filling thereof. In that apparatus, the cylinder liner, header, hose, and vent are described as a complete unit expendible periodically to maintain sanitary conditions. Since the cylinder was expendible, its cost precluded including as a part, any adjustable feature, and thus different cylinders would be required, for different measured portions.

The present invention is directed to the construction of a header for a measuring cylinder, to which there is applied in sealed relation, a flexible liner, the header and liner being replaceable as often as required with no need to replace the cylinder. It will be understood that the cylinder in no way contacts the product and therefore need not be replaced. The invention further relates to a feature of the cylinder construction rendering it possible to vary at will the quantity measured, and hence the portion to be dispensed. Further the invention has to do with the ready application of the liner and header to the cylinder, so that the disposal of a unit and the replacement of a fresh unit, requires a minimum of effort and precludes any chance of a non-sanitary installation.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 4 is an enlarged fragmentary sectional view showing the attachment of the liner to the header; and taken on line 4—4 of FIGURE 3;

FIGURE 5 is a greatly enlarged fragmentary view of the lower half of the header and liner, and an attachment clip, which for illustration purposes has been displaced 90 degrees from the usual position thereof as indicated in FIGURES 1 and 3;

FIGURES 6, 7, 8, 9, 10 and 11 are fragmentary enlarged sectional view of variations in the method of attaching the liner to the header.

Figure 2:
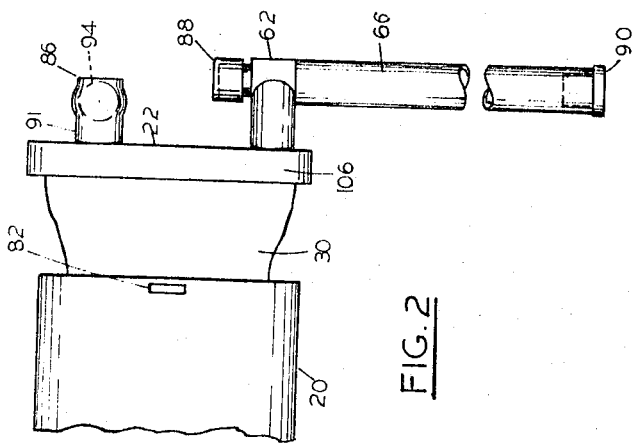
FIGURE 2 is a fragmentary elevational view of the cylinder, with header assembly partly removed.
Figure 1:
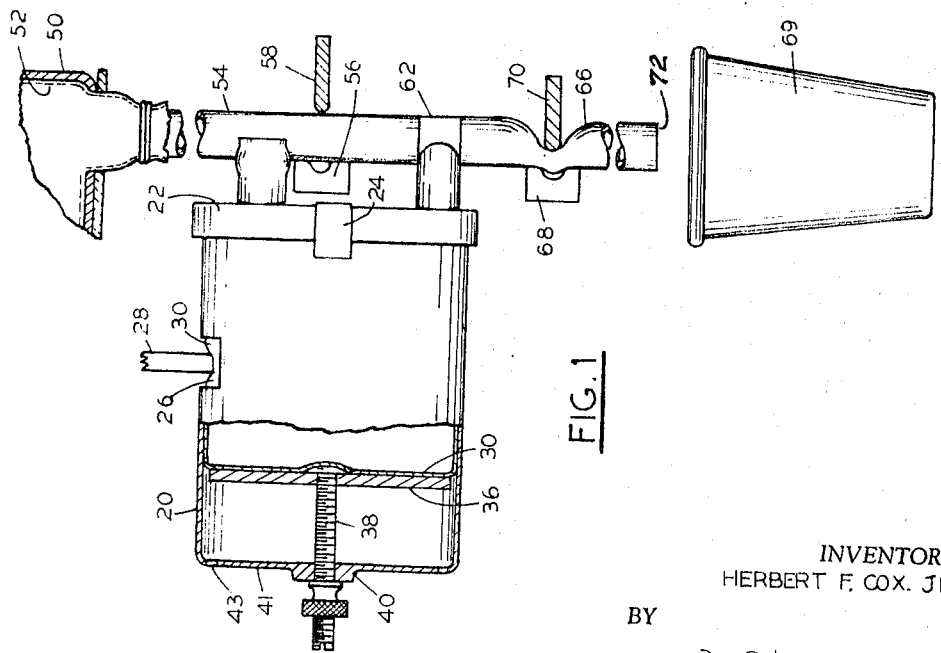
FIGURE 1 is a schematic side elevation of the measuring cylinder, supply and dispensing valves and with header and liner assembly in place.

In FIGURE 1, there is shown a measuring cylinder 20, having a header 22 applied thereto by two or more spring clips, as indicated at 24. The measuring cylinder 20 is provided with an opening 26 in its upper wall so that a switch actuating sensor arm 28 may contact the liner 30 when filled out against the internal wall of the cylinder, the sensor arm being a part of the control apparatus. In FIGURE 2, the header, and liner unit are shown as separated from the cylinder as in the course of installation of the cap and liner unit within the cylinder. The cylinder is provided with an adjustable end wall, in the form of a disk 36 that is carried on a threaded stem 38, threaded through a boss 40 in the cylinder end wall 41. The stem is provided with a transverse slot in its end to receive a screw driver, or other special tool, and a lock nut, it being desirable that the adjustment be limited to authorized persons having a special tool, since the adjustment will determine the quantity of each portion dispensed.

As shown in FIGURE 1, the cylinder liner is adapted to be filled from a container 50 disposed on a cabinet shelf above the control apparatus. The container has a thin wall flexible liner bag 52 of polyethylene, or the like, to which is attached a short length of resilient hose 54 capable of being controlled by a pinch valve, indicated as comprising a fixed block 56, and a movable clamp arm 58 also a part of the control apparatus. The hose is attached to the upstanding branch 60 of a "T" 62 formed integral with the header, as will appear in FIGURE 5, and also FIGURE 3, where the upper and lower branches of the "T" 60 and 64 are shown uncapped and uncovered. Referring again to FIGURE 1, the lower branch of the T is equipped with a short section of resilient hose 66, adapted to cooperate with a pinch valve control indicated by the fixed block 68 and clamp arm 70 such pinch valve being a part of the control apparatus. The lower end 72 of the hose is adapted to discharge into a cup 69 of adequate size to hold the volume of liquid contained in the liner 30 in the cylinder as predetermined by the setting of the adjustable disk 36. The end wall 41 of the cylinder will be provided with one or more vents such as 43 so that air may enter or leave the cylinder as the liner fills out, on filling, or collapses on discharge. The disk 36 has a loose fit within the cylinder to permit the passage of air therearound.

Briefly, the cylinder and supply 50, if for example milk, will be disposed within a refrigerated cabinet. If hot coffee for example, the cylinder and supply would be maintained at a suitable temperature. In either event, the linear will be allowed to fill out against the internal cylinder wall and against the disk 36, on being filled from the supply 50 through the tube 54 when the pinch valve clamp 58 is in open position, the discharge hose 66 being sealed off as by the clamp 70 being in closed position as indicated. A sensor arm 28, moved by light upward pressure of the liquid in the liner, at the opening 26 will indicate when the liner has fully filled out against the measuring cylinder wall, and thus contains the proper measured amount.

The control apparatus, when actuated by a coin or manual switch, will proceed through a cycle of operations, assuming sensor 28 indicates a full measure in the liner 30, by first closing off tube 54, by operation of pinch valve clamp 58, and thereafter opening tube 66, to discharge the contents of liner 30, as it collapses, into the cup 69, the pinch valve clamp 70 remaining in open position for a period long enough to permit substantially complete discharge and collapse of the liner and its contents. Thereafter tube 66 is sealed off by clamp 70, tube 54 is opened by actuation of clamp 58 to the position shown and the liner again fills out with liquid to the extent permitted by the setting of the disk 36 in the measuring cylinder 20.

It will be understood that when the container 50 becomes empty, it is replaced with a new container having a fresh supply, and the empty container, being of the single service disposable type, is thrown away with its hose 54, hose 54 being detached from the upper branch of the T 62. If at this time for sanitary reasons, the header and liner assembly require replacement, the header may be removed from the cylinder 20 by releasing the spring clips 24, which engage integral lugs 82 on the cylinder, and the peripheral ring 106 of the header assembly. The header assembly, its liner 30, hose 66, and air bleed 86 are thrown away.

Figure 3:
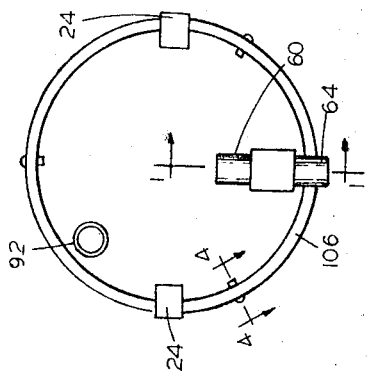
FIGURE 3 is an end elevation of the header and liner assembly.

A new sanitary or sterile assembly comprising a header, T 62, having its upper branch capped as at 88, and its lower branch 64 provided with a suitable length of discharge hose 66 plugged as at 90, and a short bleed hose 91 on nipple 92, the bleed hose end being distended slightly and sealed by a ball 94 therewithin. In order that the bleed port will not interfere with the hose 54 and its connection with the T, such port may be located off center as is shown in FIGURE 3. The liner of the header assembly will preferably be substantially collapsed. Such assembly is indicated in FIGURE 2, in a position about to be installed in the cylinder 20. After installation, the clips 24 are snapped in place, the cap 88 removed, the plugged end of hose 54 cut off while the hose is pinched to prevent flow. Thereupon the hose end is connected to the upper branch 60 of the T. Liquid from the new supply is allowed to flow into and fill out the liner. The cylinder and installed liner assembly are tilted to temporarily locate the air bleed 86 upper most, and the hose 91 is squeezed about the ball 94 to vent any air within the liner. The cylinder and header assembly are then placed in position, upon a support provided therefor with sensor arm 28 in position, and the upper end lower branches of the T extending vertical. The hose 54 is then placed between the block 56 and clamp 58, and the hose 66 placed between the block 68 and clamp 70, which clamp will be resiliently held in cut off position. Thereafter the plugged end of the tube 66 may be cut off with a sterile sharp knife or razor blade, and the apparatus is ready for service.

The liner may be secured to the header by various means. In FIGURES 4 and 5, the liner 30 is drawn over the cylindrical wall 100 of the header flange 102, and stretched over an annular rib 104, and an O-ring 105. An L-sectioned ring 106 is then applied to clamp the liner against the O-ring. The ring 106 may be secured in place by three or more pins such as 108, in FIGURE 4, or by heat forming over the rib as indicated at 110 in FIGURE 6. The ring may have an annular snap head of hooklike configuration 112 as indicated in FIGURE 7, which may be resiliently stretched during application to clear the rib 104. If desired the hook like bead may be three or four separate hook projections, spaced uniformly around the ring rather than a continuous annular bead. In FIGURE 8 the film 30 is shown as stretched over and around the annular rib 104 of the header, and heat sealed or adhesively sealed to the rib.

In FIGURE 9, with an annular groove in which liner 30 is stretched over the annular rib 104, and the film held in a hermetic sealed about the rib by a band 120 of shrinkable material, which may be shrunk by means of heat or evaporization of contained stabilizing liquid. In FIGURE 10 an O-ring of circular section 122 is disposed in an annular groove 124 in the rib 104, before stretching the film 30 over the rib, and applying the band 126 of shrinkable material. In FIGURE 11, the ring 130 is of rectangular cross section, and the groove 132 of similar cross section to receive the band. The film 30 is stretched over the rib and ring before shrinking the band 134 therearound.

It can be seen that the header 22, liner 30, vent 86 the T capped as at 88 and fitted with a plugged hose 66 can be manufactured under sterile conditions at low cost as an assembly, and the liner may be pancaked against the header wall and substantially devoid of gas or air. So long as the vent is sealed, and the T is capped as at 88, and the hose plugged as at 90, sterile conditions are maintained, all that has to be done is remove the cap 88 and immediately attach the open end of the hose 54 from a liquid supply. Thus substantially no opportunity is afforded to interfere with the maintenance of sterile conditions during the installation of a new header assembly.

Once the header assembly is installed on the cylinder end, the entire unit is replaced in proper position in relation to the pinch valves and sensor arm.

Due to the flexible thin wall nature of the liner 30, a header having a liner of sufficient size to distend and operate within the measuring cylinder 20 without stress when set for full capacity, is equally operative in such cylinder when adjusted for a lesser quantity, and thus a header assembly of but one size, to satisfy full capacity, is sufficient for use under any adjustment of the disk 36 in the cylinder 20.

While one form of the invention with variations has been illustrated and described, it is to be understood that the invention is not limited thereto. As various changes may be made without departing from the spirit of the invention, as will be apparent to those skilled in the art, reference will be had to the appended claims for a definition of the limits of the invention.

What is claimed is:

1. A unitary header assembly for use in a rigid confining cylinder for measuring and dispensing a predetermined quantity of liquid, comprising a header adapted to be releasably clamped to the open end of the cylinder and having a continuous peripheral edge, said header having a thin wall flexible impervious liner with its open end stretched over the peripheral edge of the header, and said liner being adapted to distend within the cylinder whose internal wall circumference is less than the circumference of the header peripheral edge without stress, when the header is secured to the open end of the cylinder, said header having port means close to its peripheral for introducing into and discharging liquid from said liner, and a sealing means for said port means, whereby the interior of the liner may be retained hermetically sealed to maintain a sterile condition therewithin.

2. A liquid measuring device comprising a substantially cylindrical chamber open at one end, a circular header for the chamber having a peripheral edge and thin wall flexible liner peripherally stretched over the edge and secured to the header in sealed relation, means for securing the header upon the open end of the chamber, with the liner within the chamber, said liner being of a length and girth to fill out without stress against the chamber wall when filled with liquid, and being unattached to the chamber, port means in the header adjacent to the inside diameter of the chamber for introducing into and discharging liquid from the liner, said chamber having a vent, a disk within the chamber adjacent the other end of the chamber, adjustable means for moving the disk to a selected position at a desired spacing from the header to confine the space within the chamber in which the liner may fill out when filled with liquid, and thereby control the volume of liquid that may be introduced into the liner.

References Cited

UNITED STATES PATENTS

| | | | |
|---|---|---|---|
| 2,541,934 | 2/1951 | Piazze | 215—11 |
| 2,876,113 | 3/1959 | Barton | 215—11 X |
| 3,190,562 | 6/1965 | Atwood et al. | 222—386.5 X |
| 566,282 | 8/1896 | Bailey | 222—386.5 |
| 904,095 | 11/1908 | Shea | 222—107 |
| 1,015,680 | 1/1912 | Hollingsworth | 222—440 |
| 2,063,430 | 12/1936 | Graser | 222—386.5 |
| 2,321,836 | 6/1943 | Marzo | 222—386.5 |
| 2,446,451 | 8/1948 | Allen | 222—107 |
| 2,476,446 | 7/1949 | Lindell | 222—107 |
| 2,778,534 | 1/1957 | Ramsey | 222—207 X |
| 2,963,202 | 12/1960 | Dickinson et al. | 222—386.5 X |
| 3,003,328 | 10/1961 | Bauerlein | 222—207 X |

SAMUEL F. COLEMAN, *Primary Examiner.*

U.S. Cl. X.R.

222—207, 386.5, 440